US010929290B2

(12) United States Patent
Nachimuthu et al.

(10) Patent No.: US 10,929,290 B2
(45) Date of Patent: Feb. 23, 2021

(54) MECHANISM FOR PROVIDING RECONFIGURABLE DATA TIERS IN A RACK SCALE ENVIRONMENT

(71) Applicant: Intel Corporation, Santa Clara, CA (US)

(72) Inventors: Murugasamy K. Nachimuthu, Beaverton, OR (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 479 days.

(21) Appl. No.: 15/396,562

(22) Filed: Dec. 31, 2016

(65) Prior Publication Data

US 2018/0188989 A1    Jul. 5, 2018

(51) Int. Cl.
*G06F 15/177*    (2006.01)
*G06F 12/06*    (2006.01)

(52) U.S. Cl.
CPC ...... *G06F 12/0638* (2013.01); *G06F 12/0607* (2013.01); *G06F 2212/1016* (2013.01)

(58) Field of Classification Search
CPC .... G06F 9/5061; G06F 11/3447; H04L 47/70; H04L 41/5054
See application file for complete search history.

(56) References Cited

U.S. PATENT DOCUMENTS 7,324,403 B2 *    1/2008    To ............................ G06F 1/10
                                                                365/194
8,316,124 B1 *    11/2012    Baumback .............. H04L 67/22
                                                                709/224
2011/0022907 A1 *    1/2011    Jiang ................. G01R 31/31851
                                                                714/725
2011/0276674 A1 *    11/2011    Jensen-Horne ........ G06F 9/5061
                                                                709/223
2012/0310870 A1 *    12/2012    Caves ................. G06F 11/3688
                                                                706/14
2013/0219068 A1 *    8/2013    Ballani ................. G06F 9/5061
                                                                709/226
2015/0052526 A1 *    2/2015    Fujiwaka ............ G06F 11/3433
                                                                718/1
2017/0091079 A1 *    3/2017    Zhou ................... G06F 11/3414
2017/0316079 A1 *    11/2017    Lu ......................... G06F 16/285

\* cited by examiner

*Primary Examiner* — Oleg Survillo
(74) *Attorney, Agent, or Firm* — Nicholson De Vos Webster & Elliott LLP

(57) ABSTRACT

System, method, and machine readable medium implementing a mechanism for selecting and providing reconfigurable hardware resources in a rack architecture system are described herein. One embodiment of a system includes a plurality of nodes and a configuration manager. Each of the nodes further includes: a plurality of memory resources and a node manager. The node manager is to track the memory resources that are available in the node, determine different possible configurations of memory resources, and generate a performance estimate for each of the possible configurations. The configuration manager is to receive a request to select one or more nodes based on a set of performance requirements, receive from each node the different possible configurations of memory resources and the performance estimate for each of the possible configurations, and iterate through collected configurations and performance estimates to determine one or more node configurations best matching the set of performance requirements.

23 Claims, 17 Drawing Sheets

Memory Side Cache Level 0

| Size | Cache Level | Cache Attributes | Proximity Domain | Read Latency | Write Latency | Read Bandwidth | Write Bandwidth | Memory Type |
|---|---|---|---|---|---|---|---|---|
| 2GB (2+2) | | WB, MORE_RELIABLE | Socket1 | 500 | 500 | 510 | 510 | DDR4 |
| 92GB | 0 | (E820 Type1) WB | Socket2 | 1000 | 1000 | 270 | 270 | (S1) DDR4 |
| 96GB | 0 | (E820 Type1) WB | Socket1 | 500 | 500 | 510 | 510 | (S1) DDR4 |
| | | (E820 Type1) | Socket2 | 1000 | 1000 | 270 | 270 | (S2) |
| 16GB | 0 | WB | Socket1 | 500 | 500 | 680 | 680 | HBM |
| | | (E820 Type1) | Socket2 | 1000 | 1000 | 270 | 270 | (S1) |
| 16GB | 0 | WB | Socket1 | 1000 | 1000 | 270 | 270 | HBM |
| | | (E820 Type1) | Socket2 | 500 | 500 | 680 | 660 | (S2) |
| | | | | | | | | Hole for alignment |
| 256GB | 64GB | WB | Socket1 | 2000 | 1500 | 140 | 80 | Memory Side Cached Memory |
| | | (E820 Type1) | Socket2 | 2500 | 2000 | 140 | 80 | (MM – S1) |
| 256GB | 64GB | WB | Socket1 | 2500 | 2000 | 140 | 80 | Memory Side Cached Memory |
| | | (E820 Type1) | Socket2 | 2000 | 1500 | 140 | 80 | (MM – S2) |
| 256GB | 0 | WB, NV | Socket1 | 2000 | 1500 | 140 | 80 | App-Direct |
| | | (E820 Type7) | Socket2 | 2500 | 2000 | 140 | 80 | (S1) |
| 256GB | 0 | WB, NV | Socket1 | 2500 | 2000 | 140 | 80 | App-Direct |
| | | (E820 Type7) | Socket2 | 2000 | 1500 | 140 | 80 | (S2) |

Latency Base Unit = 1 micro second
Bandwidth Base Unit = 1GB/s
Latency and Bandwidth Base = 10 (actual value multiplied by 10)

FIG. 5

Memory Side Cache Level 1

| SPA Range | Size | Memory Side Cache Size | Attributes | CPU Core Bandwidth | Read hit Latency | Write hit Latency | Read hit Bandwidth | Write hit Bandwidth | Notes |
|---|---|---|---|---|---|---|---|---|---|
| 512GB-768GB | 256GB | 64GB | WB (E820 Type 1) | Socket1<br>Socket2 | 500<br>1000 | 500<br>1000 | 340<br>270 | 340<br>270 | Memory Side Cached Memory (MM – S1) |
| 768GB-1TB | 256GB | 64GB | WB (E820 Type 1) | Socket1<br>Socket2 | 1000<br>500 | 1000<br>500 | 270<br>340 | 270<br>340 | Memory Side Cached Memory (MM – S2) |

Latency Base Unit = 1 micro second
Bandwidth Base Unit = 1GB/s
Latency and Bandwidth Base = 10 (actual value multiplied by 10)

FIG. 6

US 10,929,290 B2

MECHANISM FOR PROVIDING RECONFIGURABLE DATA TIERS IN A RACK SCALE ENVIRONMENT

BACKGROUND INFORMATION

In on-demand rack architecture systems, when a user requests a computing system with a particular set of memory requirements, such as memory capacity and performance characteristics, a configuration manager typically just scans all available compute nodes in the system for the ones that best match the requirements specified, and presents or allocates them to the user. This works fine for traditional computing nodes which are typically configured with memory DIMMs that share the same type of memory technology (e.g., DDR3 or DDR4) and memory modes (e.g., BIOS set to interleave memory DIMMs with the maximum interleave channels possible). In other words, the memory DIMMs in traditional computing systems often times share similar performance characteristics which makes comparing and choosing between them a relatively straight forward task. However, with new advances in memory technology, where it is now possible for a compute node to have memory that are configurable to provide a wide range of performance characteristics, a better way is needed to select compute nodes that best match user memory requirements.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5 is a table illustrating the physical address mapping and performance characteristics of memory side cache level 0 according to an embodiment;

FIG. 6 is a table illustrating the physical address mapping and performance characteristics of memory side cache level 1 according to an embodiment;

DETAILED DESCRIPTION

Figure 1:
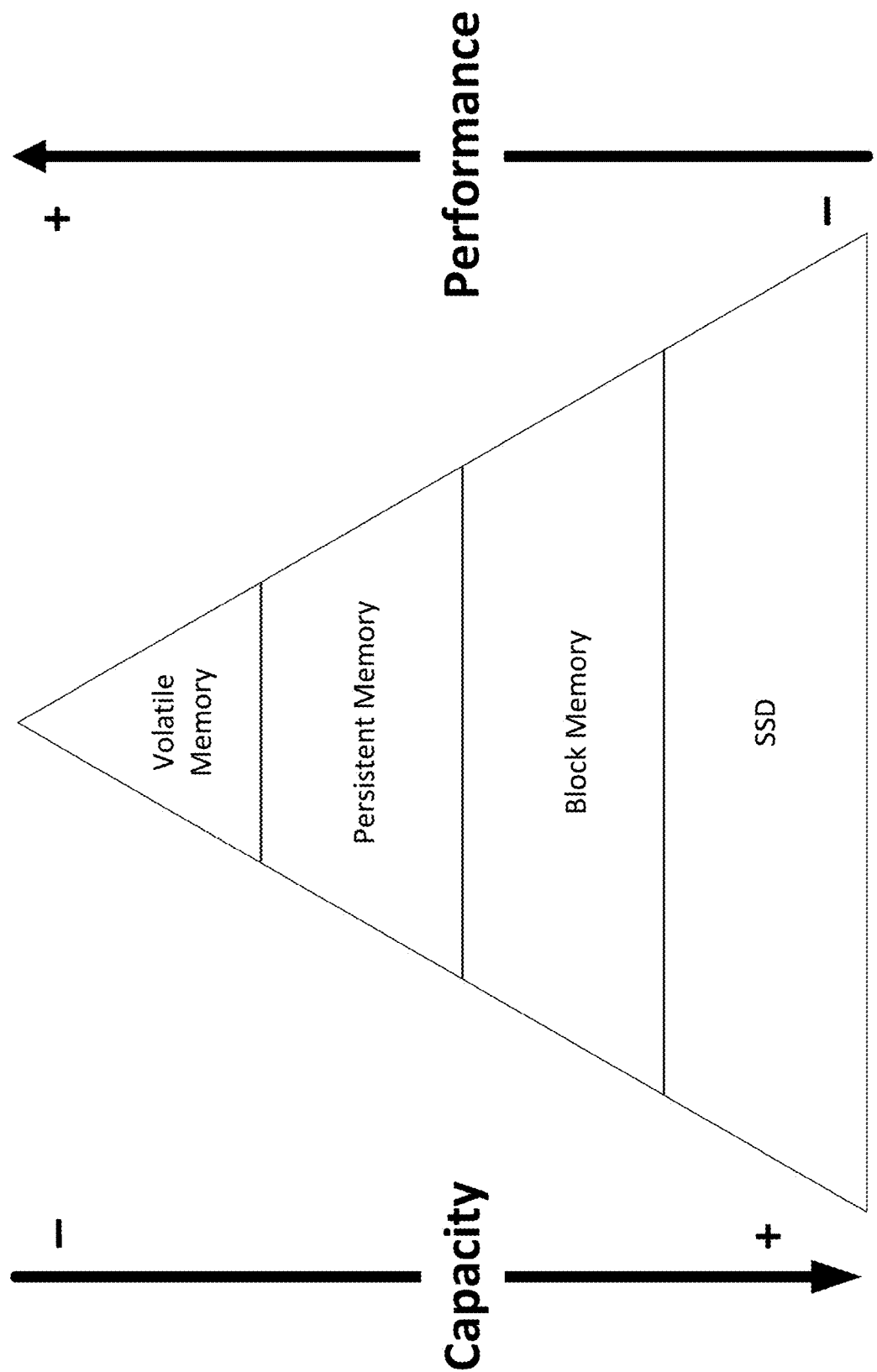
FIG. 1 illustrates a capacity and performance level comparison between the different tiers of memory technology.

Embodiments of system, method, and machine readable medium implementing a mechanism for selecting and providing reconfigurable hardware resources in a rack architecture system are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

In a rack architecture system, compute nodes with reconfigurable memory technologies can offer vastly different levels of performance depending on specific workloads or needs. For example, some new memory technologies, such as 3D Xpoint™ developed by Intel® Corporation of Santa Clara, Calif., memory DIMMs may be sub-divided (i.e., partitioned) into multiple regions. Each of these regions may be separately configured to serve as a specific type of memory, such as persistent memory, volatile memory, block storage memory, solid state drive (SSD) type memory, etc. In addition, some of the regions may be configured to provide special functionalities such as reliability, accessibility, and serviceability (RAS) through, for example, memory mirroring where memory writes are duplicated on two regions to provide data redundancy. Some of regions may even be utilized as cache by the DRAM while other are not. Thus, depending on how the various memory technologies are utilized and configured, compute nodes with identical memory components may provide widely varying levels of performance. However, the current practice employed in most data center management software or hardware is simply to retrieve the current configuration of the compute nodes and try to guestimate the performance of these compute nodes to match the set of hardware configuration requirements specified by the user. Such node selection fails to take into account the flexibility and configurability of different modes offered by new memory, as well as other hardware, technologies. Aspects of the present invention provides a mechanism for each compute node to communicate varying level of tiers and configurations of memory, as well as other hardware resources, to a configuration manager, which in turn enables the configuration manager to select specific configurations and nodes that more accurately match the user's requirements. Each node may provide to the configuration manager a configurations table that includes estimated and/or actual performance data for each possible configuration. For example, the entries in the configurations table may be in the following format: {Configuration number, Performance Data #1 of Resource #1, Performance Data #2 of Resource #1 . . . Performance Data #1 of Resource #2, Performance Data #2 of Resource #2 . . . Performance Data #1 of Resource #N . . . Performance Data #M of Resource #N}. Another embodiment of the current invention envisions a mechanism that allows users or user programs to customize configurations of difference node resources to fit a particular workload and receive from the reconfigured node actual performance results based on the customization. In a preferred embodiment of a rack architecture system, the configuration manager communicates to one or more pooled node manager in the rack. Each pooled node manager in turn communicates to one or more compute nodes in their respective pool of nodes through each compute node's node manager. According to an embodiment, the communication between the pooled node manager and the node manager are made through their respective out of band interface to provide additional level of security.

FIG. 1 illustrates the capacity and performance levels comparison between the different types and tiers of memory technology. For example, volatile memory tends have the highest performance but usually the lowest capacity. On the other hand, solid state drive (SSD) may have the highest capacity compared to other types of memory technology, but it usually provides the lowest performance in terms of bandwidth and latency.

Figure 2:
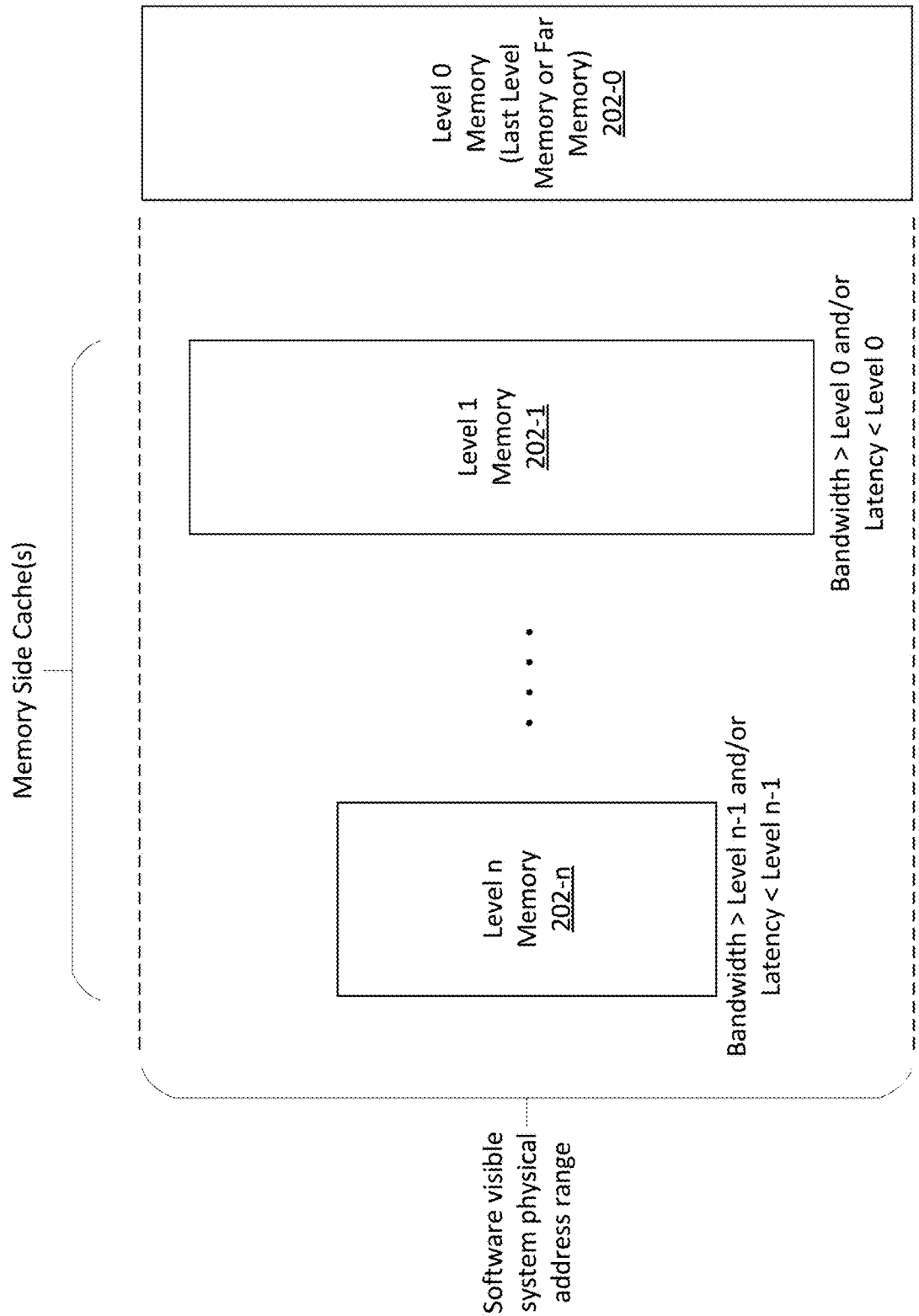
FIG. 2 illustrates an overview of the memory side cache.

FIG. 2 illustrates an overview of the memory side cache. Typically, the memory available in a system are divided into different memory levels for caching purposes. Level 0 memory, also known as last level memory or far memory, includes the full range of system physical addresses that is visible to the operating system (OS) and software. Each of the next level of memory is closer to the processor and contains a smaller portion of the system physical address visible to the OS/software than the level above it. For example, level 1 memory 202-1 is close to the processor than level 0 memory 202-0 and contains a small portion of system physical addresses that are visible to the OS/software than level 0 memory 202-0. Due to the difference in size, each level of memory typically provides better performance than the level about it. For instance, level 1 memory 202-1 is generally able to offer higher bandwidth and lower latency than level 0 memory 202-0.

Figure 3:
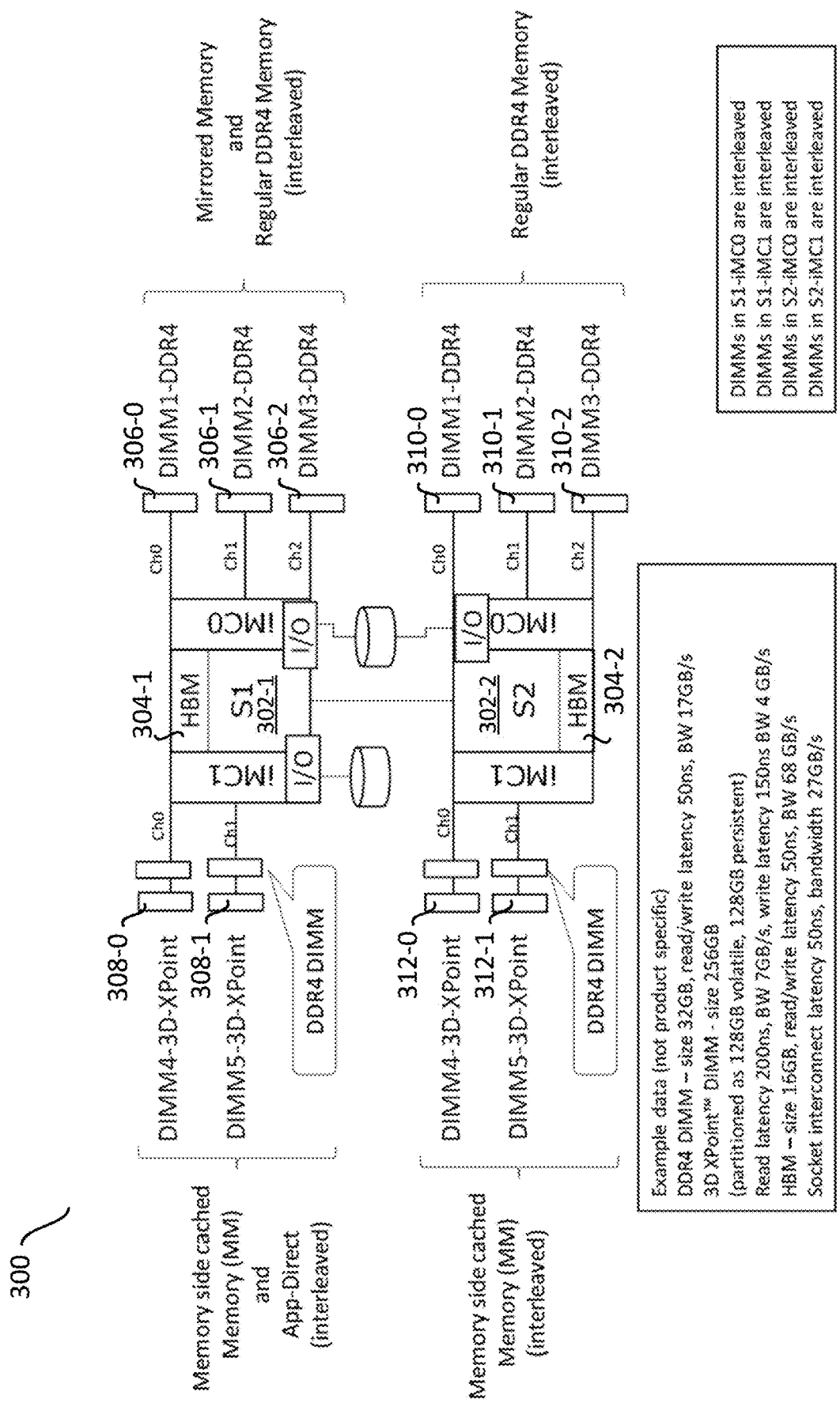
FIG. 3 illustrates an exemplary memory configuration in a compute node according to an embodiment.
Figure 4:
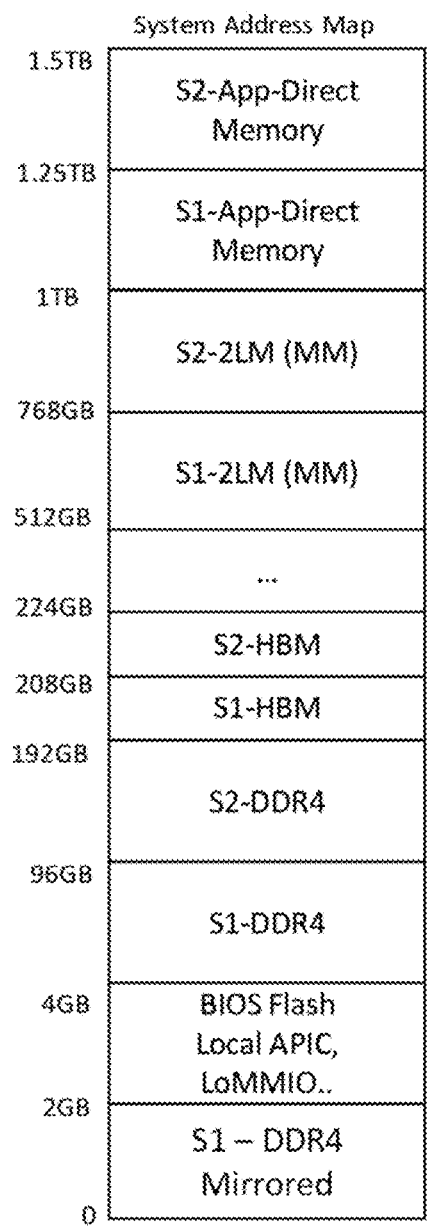
FIG. 4 illustrates an exemplary mapping of the physical addresses in a system in accordance to an embodiment.

FIG. 3 illustrates an exemplary memory configuration in a compute node. Memory configuration 300 includes several different memory technologies each providing a different level of performance in terms of bandwidth and latency. For example, Memory configuration 300 includes two sockets S1 302-1 and S2 302-2. The memory connected to socket 1 302-1 includes high bandwidth memory (HBM) 304-1, DDR4 306, and 3D XPoint™ 308. The memory connected to socket S2 302-2 also includes HBM 304-2, DDR4 310, and 3D XPoint™ 312. From table 301, which provides the capacity, latency, and bandwidth for each of the different types of memory, it is evident that the capacity and performance of the memory in a compute node can vary dramatically. In addition, the different types of memory may further be configured and utilized in different modes which further contribute to the performance disparity. For example, the DDR4 DIMMs 306-0-306-2 in socket S1 302-1 serve as mirrored memory while the DDR4 DIMMs 310-0-310-2 in socket 302-2 do not. Meanwhile, the 3D-Xpoint™ memory DIMMs 308-0, 308-1, 312-0, and 312-1 in both sockets are designated as memory side cached memory as well as app-direct memory, while being partitioned as half volatile memory and half persistent memory. Thus, from FIG. 3, it is easy to see memory resources in a compute node can increase in complexity very quickly. An example of how the physical memory addresses in the compute system are mapped to each particular memory is shown in FIG. 4. FIGS. 5 and 6 are tables showing the detail mapping of how memory side cache level 0 and 1 are mapped to the memory configuration 300 and their respective performance characteristics. Note that although both memory side cache 0 and 1 are mapped to the same components (MM-S1 and MM-S2), the performance level between the two cache levels are significantly different.

Figure 7:
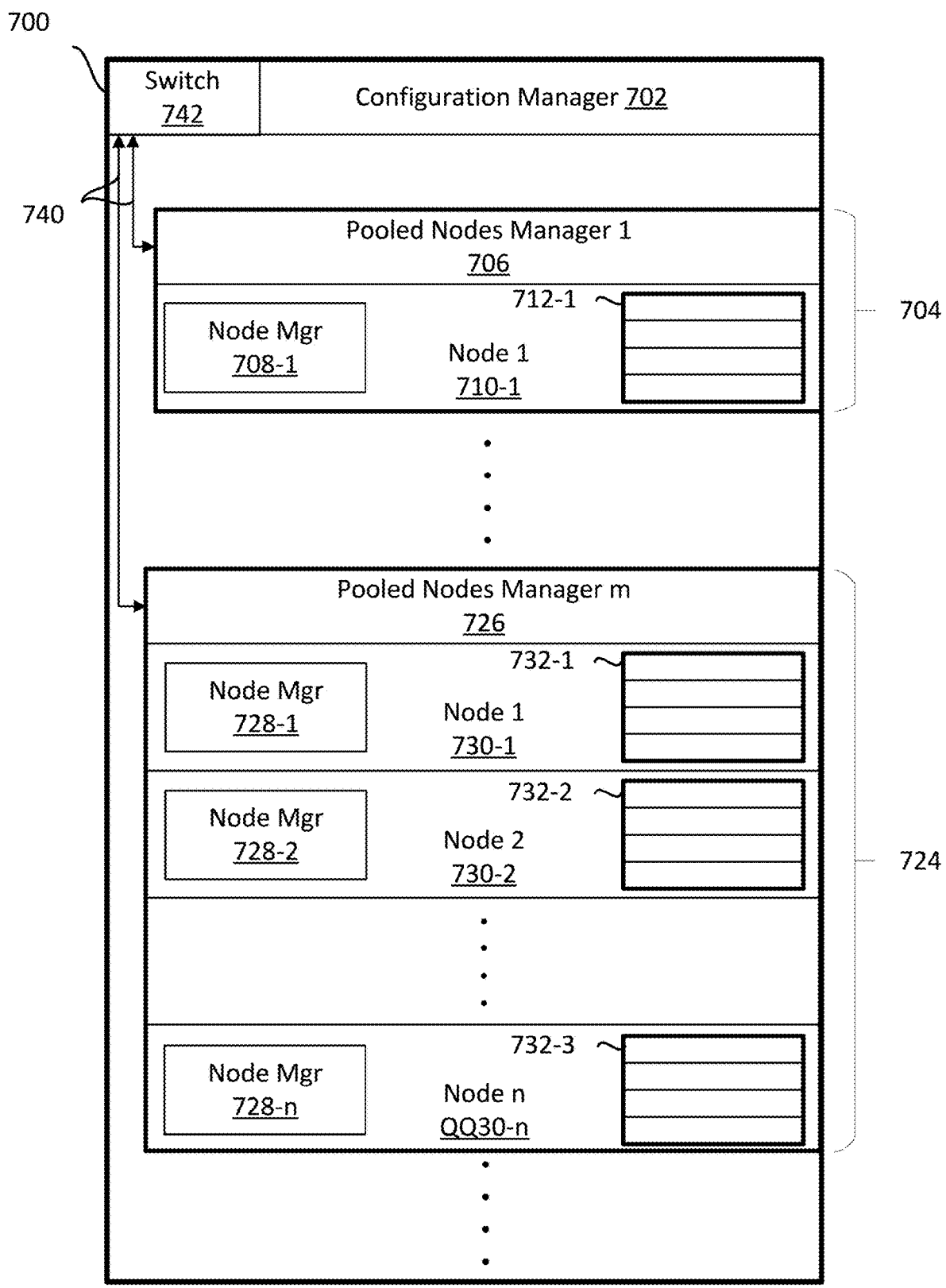
FIG. 7 illustrates an exemplary system platform on which embodiments of the present invention may be implemented.

FIG. 7 illustrates an exemplary system platform on which embodiments of the present invention may be implemented. In one embodiment, the system platform is a rack scale computing system. The system platform includes a rack 700 that houses one or more nodes. The nodes may be grouped together into one or more pools. Each pool of nodes may contain any number of nodes. Rack 700 is shown with two groups of nodes 704 and 724. Each group of nodes include a pooled nodes manager. Each of the nodes includes a node manager and a plurality of memory resources. For example, node group 704 includes a pooled node manager 706 and a single node 710-1. The node 710-1 further includes node manager 708-1 and resources 712-1. Similarly, node group 704 includes pooled node manager 726 and n nodes 730-1-730-n. Each of the n nodes includes a respective node manager 728 and a plurality of resources 732. According to an embodiment, the plurality of resources are memory resources. However, as noted below, the plurality of resources 712/732 may be any type of hardware resources. An interconnect 740 couples the different pools of nodes to rack management switch (switch) 742. In an embodiment, interconnect 740 is an Ethernet connection. However, other suitable types of connection technology, such as Omni Path™ developed by Santa Clara's Intel® Corporation, may also be used. A configuration manager 702 may be used by a user or a program to query, request, select, and/or configure one or more nodes to perform a workload. In one embodiment, the configuration manager 702 is a software running on the rack platform 700. In another embodiment, the configuration manager 702 is implemented as customizable or hardwired circuitry in the rack platform 700. According to an embodiment, the configuration manager 702 includes: a receiver circuitry, such as a user/program interface, to receive configuration requests from users and/or programs to select one or more nodes for processing a workload; a node interface circuitry to receive different possible resource configurations and performance estimates from different nodes; and an analyzer circuitry to iterate through all the different possible resource configurations and performance estimates to determine node configurations that best matches the performance requirements set by the user or program.

Figure 8:
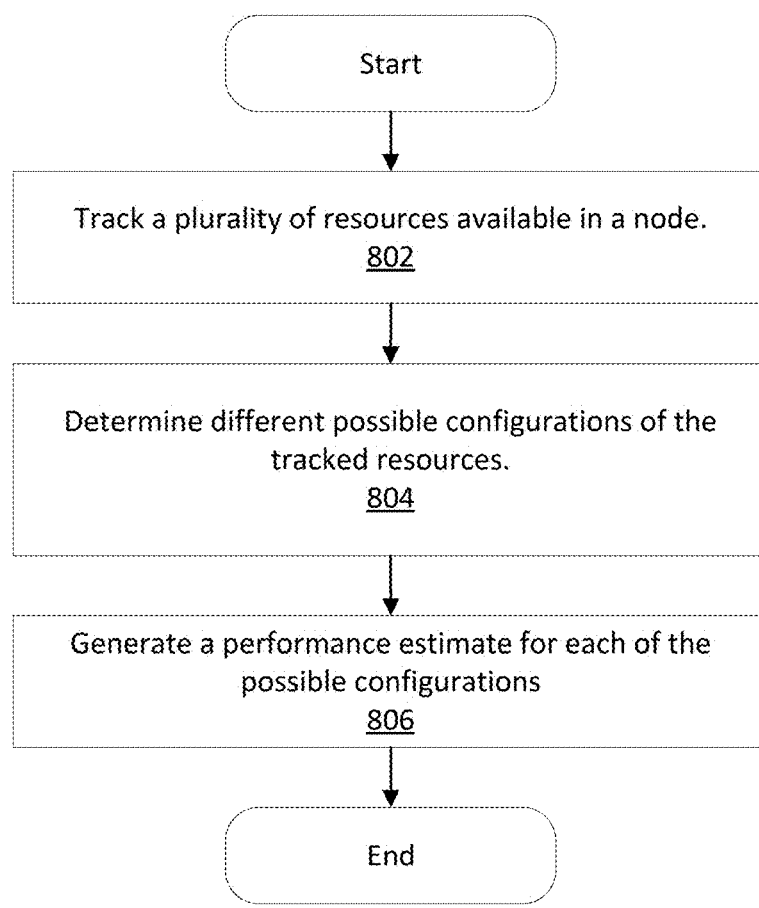
FIG. 8 is a flow diagram illustrating an embodiment of the operations and logic implemented in a node manager.

FIG. 8 is a flow diagram illustrating and embodiment of the operations and logic implemented in a compute node. While the various operations in this flow diagram are presented and described sequentially, one of ordinary skill will appreciate that some or all of the operations may be executed in different order, be combined or omitted, or be executed in parallel. In one embodiment, the operations and logic illustrated in FIG. 8 are implemented in the node manager (e.g., 728-1 of FIG. 7) of a compute node. According to an embodiment, the node manager is firmware implemented in the node. In other embodiments, the node manager may be implemented as software and/or hardware, such as a hardwired circuitry. In one embodiment, the node manager includes a tracker circuitry to track the difference resources available in a node, a processor circuitry to determine all the possible configurations of the resources available, a simulator circuitry to generate performance estimates for each of the possible configurations, and a communications circuitry to provide all the possible resource configurations and performance estimate to a configuration manager.

At 802, the node manager node tracks all of the resources available to the node. In some embodiments, the tracked resources include hardware and/or software resources. The resources include hardware and/or software assets that are installed or populated in the node, as well as those that are connected and/or accessible to the node. In one embodiment, the tracked resources include memory resources such as DRAM, NVDIMM, volatile memory, persistent memory, block memory, SSD, storage, and any other memory type/technology that are available now or may be available in the future. At 804, the node manager determines the different possible configurations based on the tracked resources. For example, with respect to memory resources, the possible memory configurations may be based on memory type (e.g., volatile, persistent), memory capacity (e.g., size), memory performance (e.g., speed, bandwidth, latency), special mode/functionality (e.g., mirrored memory, interleaved memory, DRAM cache). In addition to memory resources, according to an embodiment, the node manager may also generate possible configurations of other resources. For example, the node manager may generate difference configurations for or based on storage resources (e.g., storage capacity, storage performance), core resources (e.g., core count, core speed), networking resources (e.g., network type, network speed), I/O resources (e.g., bus type, bus speed), additional computing resources (e.g., GPU, FPGA) and any other suitable resources that may be requested by the user. Some of the possible configurations may also include valid configurations, frequently used configurations, specific configurations and previously specified/used configurations. In some embodiments, the possible configurations also include sliding scale configurations that covers a range instead of a specific number. For instance, a particular configuration could include a memory capacity range of 0-128 GB instead of a fixed number (e.g., 16 GB, 32 GB, 64 GB, etc.). At 806, the node manager generates a performance estimate for each of the possible configurations. The operations and logic for generating a performance estimate will be described further below in FIG. 10.

Figure 9:
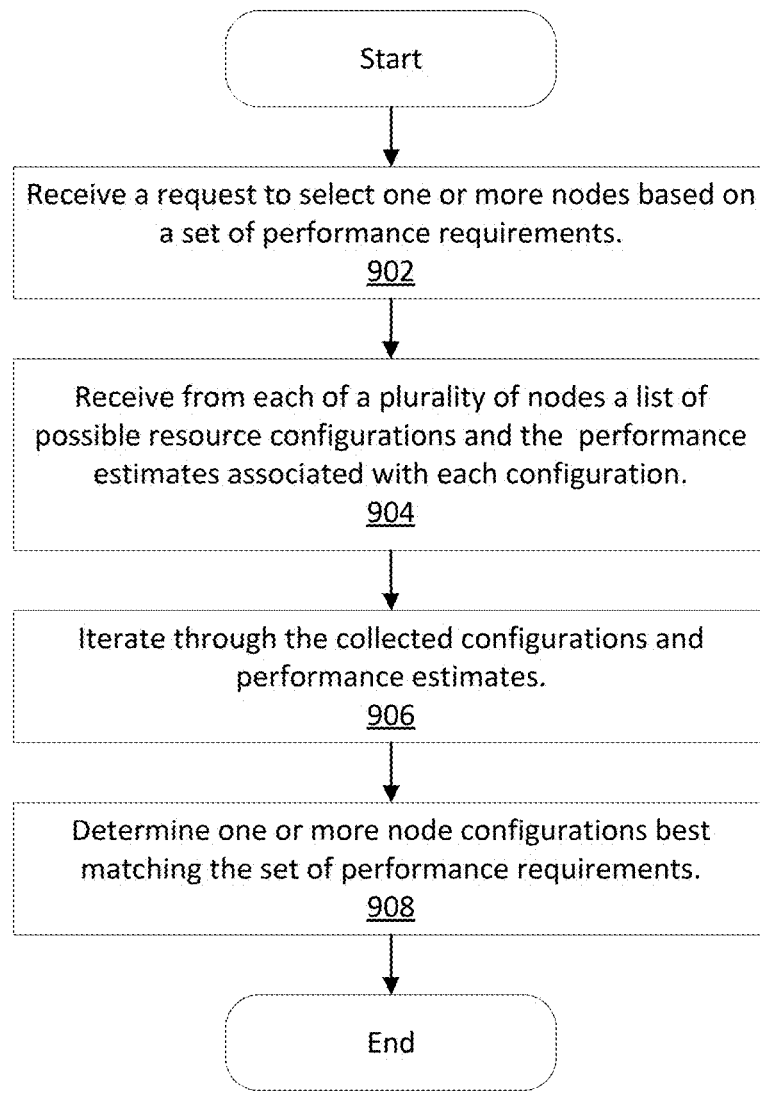
FIG. 9 is a flow diagram illustrating the operations and logic for processing a request to select one or more compute nodes based on a set of performance requirements in accordance to an embodiment.

FIG. 9 is a flow diagram illustrating the operations and logic to process a request for selecting one or more compute nodes for processing a workload according to an embodiment. While the various operations in this flow diagram are presented and described sequentially, one of ordinary skill will appreciate that some or all of the operations may be executed in different order, be combined or omitted, or be executed in parallel. In one embodiment, the operations and logic illustrated in FIG. 9 is implemented in configuration manager 702 of FIG. 7. The configuration manager may be implemented as software, hardware, or firmware. In one embodiment, the configuration manager includes an interface, such as a user interface, to communicate with the user and/or a program. The configuration manager may also include an interface to communicate with the nodes, such as through a pooled nodes manager and/or a node manager. At 902, the configuration manager receives a request to select one or more nodes based on a set of performance requirements. In one embodiment, the request is from a user or a software program operated by the user. According to an embodiment, the set of performance requirements may include memory type, memory capacity, memory performance, memory mode, storage capacity, storage performance, core count, core speed, network performance, I/O performance, GPU performance, FPGA performance, and any other suitable performance characteristics desired in a node or system of nodes to perform a particular workload. At 904, the configuration manager receives from each of the nodes in the rack system a list of possible resource configurations and the performance estimates associated with each configuration. The list may be presented as a table or matrix. According to an embodiment, the table or matrix includes information such as memory type, memory capacity, memory performance, memory mode, physical and/or virtual address map, etc. In one embodiment, the entry in the list is in the following format: {Configuration number (e.g., an identifier), Memory Type (e.g., volatile, persistent), Memory Capacity (e.g., size), Memory Performance (e.g., speed, bandwidth, latency), Memory Mode (e.g., mirrored, interleaved, used as cache), Storage Capacity (e.g., size), Storage Performance (e.g., speed, bandwidth, latency), Core Count, Core Speed, Network Type, Network Speed, Bus Type, Bust Speed, GPU performance, FPGA performance, etc.}. At 906, the configuration manager iterates through the possible configurations, performance estimates, and or actual performance data collected from the nodes in the rack system and compares them with the set of requirements and/or characteristics specified by the user or the type of workload. At 908, the configuration manager determines one or more nodes with configuration best matching the set of performance requirements in the received request. In one embodiment, a best matching configuration is the one with performance estimates closest to the performance requirements in the received request. For instance, the received request may include minimum bandwidth and maximum latency requirements. Accordingly, in one embodiment, the configuration with the performance estimate that exceeds both the minimum bandwidth and maximum latency, while utilizing the least amount of resources may be deem the best match. In other embodiments, for example, the configuration that most exceeds the performance requirements is deemed the best match.

According to an embodiment, in addition to the request to select one or more nodes based on a set of performance requirements, or subsequent to fulfilling such a request, the configuration manager may also receive a request from the user/program to configure a specific node with a particular configuration. In such case, the configuration manager would send a reconfiguration request that includes the configuration input to the specified node. Responsive to receiving the reconfiguration request, the node manager of the specified node would then reconfigure the plurality of resources in the specified node based on the configuration input. After the node is reconfigured, the node manager would provide a pass/fail result and actual performance data, if available, back to the configuration manager. The pass/fail result and the actual performance data indicate or reflect the performance of the node after being reconfigured in accordance to the configuration input.

Figure 10:
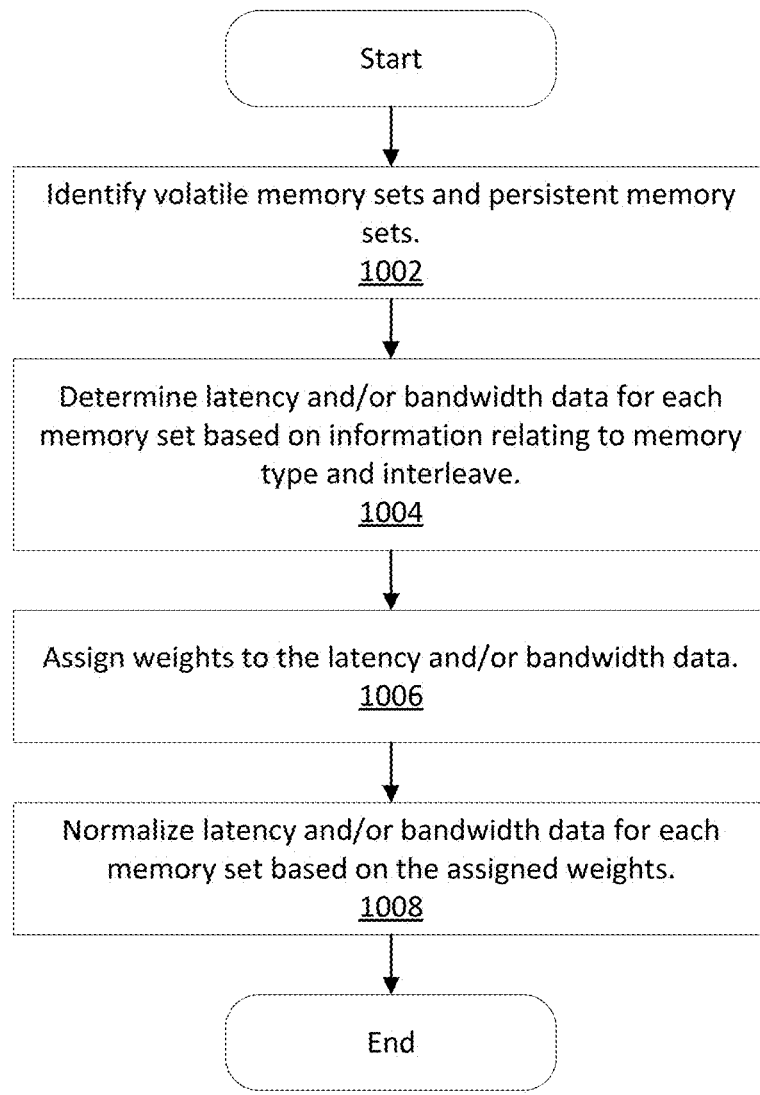
FIG. 10 is a flow diagram illustrating the operations and logic for generating a performance estimate according to an embodiment of the present invention.

FIG. 10 is a flow diagram illustrating the operations and logic for generating a performance estimate according to an embodiment of the present invention. While the various operations in this flow diagram are presented and described sequentially, one of ordinary skill will appreciate that some or all of the operations may be executed in different order, be combined or omitted, or be executed in parallel. In one embodiment, the operations and logic illustrated in FIG. 10 are implemented in a node manager (e.g., 728-1 of FIG. 7). According to an embodiment, the node manager is firmware implemented in the node. In other embodiments, the node manager may be implemented as software and/or hardware, such as a hardwired circuitry. At 1002, a device, such a node manager in a node, categorizes the resources available in a node into various sets. For example, with respect to memory resources, the node manager categorizes memory resources into volatile memory and persistent memory sets. At 1004, the node manager determines the latency and bandwidth data for each memory set based on information such as the memory type, performance, mode, and interleave setting for each memory in the set. At 1006, weights are assigned to the latency and bandwidth data. For instance, higher weight values may be assigned to the latency and bandwidth data for volatile memory and for persistent memory. Alternatively, different weight values may be assigned based on the interleave setting of each memory in the memory sets. At 1008, the latency and bandwidth information for each memory in the memory sets are normalized based on the weight values assigned. While FIG. 10 focuses on memory performance, the method is applicable to generating the performance estimates of other node resources, such as storage performance, core performance, network performance, I/O performance, additional computing performance (e.g., GPU/FPGA), etc.

One embodiment of the current invention is a system that includes a plurality of nodes and a configuration manager. Each of the plurality of nodes include a plurality of resources and a node manager. The node manager is to track the plurality of resources available in the node, to determine different possible configurations of the plurality of resources, and to generate a performance estimate for each of the possible configurations. The configuration manager is to receive a request to select one or more nodes based on a set of performance requirements, to receive from each node the different possible configurations of the plurality of resources and the performance estimate for each of the possible configurations, and to iterate through collected configurations and performance estimates to determine one or more node configurations best matching the set of performance requirements. In one embodiment, each of the plurality of nodes corresponds to a pooled nodes manager, such that the pooled nodes manager is to collect from each respective node and provide to the configuration manager, the different possible configurations of the plurality of resources and the performance estimate for each of the possible configurations. The different possible configurations of the plurality of resources may include valid configurations, most frequently used configurations, specific configurations, and/or sliding scale configurations which include a range of the plurality of resources. In one embodiment, generating performance estimates for each of the possible configurations includes identifying volatile memory sets and persistent memory sets in a plurality of memory resources, determining latency and/or bandwidth data for each memory set based on information relating to memory type and interleave, assigning weights to the latency and/or bandwidth data, and normalizing latency and bandwidth data for each memory set using the assigned weights. In one embodiment, the configuration manager is to receive the assigned weights and the latency and bandwidth data from each node. In one embodiment, a first node manager is to: receive a reconfiguration request to reconfigure a first node based on a configuration input from the configuration manager, the first node configurable by the first node manager; responsively reconfigure the plurality of resources in the first node based on the configuration input; and provide a pass/fail result and actual performance data to the configuration manager, the pass/fail result and actual performance data indicating performance of the first node after being reconfigured in accordance to the configuration input. In some embodiments, the plurality of resources may include memory resources, storage resources, core resources, networking resources, I/O resources, and/or compute resources. According to some embodiments, the set of performance requirements may include memory type, memory capacity, memory performance, memory mode, storage capacity, storage performance, core count, core speed, network performance, I/O performance, GPU performance, and/or FPGA performance.

Another embodiment of the present inventions is a method implemented in a node manager and includes: tracking a plurality of resources available in a node; determining different possible configurations of the plurality of resources; generating a performance estimate for each of the possible configurations; and providing the different possible configurations of the plurality of resources and the performance estimate for each of the possible configurations to a configuration manager. In one embodiment, the different possible configurations of the plurality of resources may include valid configurations, most frequently used configurations, specific configurations, and/or sliding scale configurations that include a range of resources. In one embodiment, the method further includes identifying volatile memory sets and persistent memory sets in a plurality of memory resources, determining latency and/or bandwidth data for each memory set based on information relating to memory type and interleave, assigning weights to the latency and/or bandwidth data, and normalizing latency and bandwidth data for each memory set using the assigned weights. In some embodiments, the method further includes providing the assigned weights and the latency and bandwidth data from each node to a configuration manager. According to some embodiments, the method further includes receiving a reconfiguration request to reconfigure the node based on a configuration input from the configuration manager, responsively reconfiguring the plurality of resources in the node based on the reconfiguration request, and providing a pass/fail result and actual performance data to the configuration manager. The plurality of resources may include memory resources, storage resources, core resources, networking resources, I/O resources, and/or compute resources.

Another embodiment of the present invention is a method implemented in a configuration manager, and the method includes: receiving a first request to select one or more nodes based on a set of performance requirements; receiving from each of a plurality of nodes a set of different possible resource configuration and a performance estimate for each of possible configuration in the set; and iterating through the set of different possible resource configurations and the performance estimates to determine one or more node configurations best matching the set of performance requirements. In some embodiments, the set of performance requirements may include: memory type, memory capacity, memory performance, memory mode, storage capacity, storage performance, core count, core speed, network performance, I/O performance, GPU performance, and/or FPGA performance. According to an embodiment, the method further includes: receiving a second request to configure a specified node according to a configuration input; sending a reconfiguration request to the specified node, the reconfigure request comprising the configuration input; and receiving a pass/fail result and actual performance data from the specified node, the pass/fail result and actual performance data indicating performance of specified node after being reconfigured in accordance to the configuration input.

Another embodiment of the present invention includes a non-transitory machine readable medium having program code stored thereon which, when executed by a machine, causes the machine to perform operations of: tracking a plurality of resources available in a node; determining different possible configurations of the plurality of resources; generating a performance estimate for each of the possible configurations; and providing the different possible configurations of the plurality of resources and the performance estimate for each of the possible configurations to a configuration manager. In one embodiment, the different possible configurations of the plurality of resources may include valid configurations, most frequently used configurations, specific configurations, and/or sliding scale configurations that include a range of resources. In one embodiment, the method further includes identifying volatile memory sets and persistent memory sets in a plurality of memory resources, determining latency and/or bandwidth data for each memory set based on information relating to memory type and interleave, assigning weights to the latency and/or bandwidth data, and normalizing latency and bandwidth data for each memory set using the assigned weights. In some embodiments, the method further includes providing the assigned weights and the latency and bandwidth data from each node to a configuration manager. According to some embodiments, the method further includes receiving a reconfiguration request to reconfigure the node based on a configuration input from the configuration manager, responsively reconfiguring the plurality of resources in the node based on the reconfiguration request, and providing a pass/fail result and actual performance data to the configuration manager. The plurality of resources may include memory resources, storage resources, core resources, networking resources, I/O resources, and/or compute resources.

Another embodiment of the present invention includes a non-transitory machine readable medium having program code stored thereon which, when executed by a machine, causes the machine to perform operations of: receiving a first request to select one or more nodes based on a set of performance requirements; receiving from each of a plurality of nodes a set of different possible resource configuration and a performance estimate for each of possible configuration in the set; and iterating through the set of different possible resource configurations and the performance estimates to determine one or more node configurations best matching the set of performance requirements. In some embodiments, the set of performance requirements may include: memory type, memory capacity, memory performance, memory mode, storage capacity, storage performance, core count, core speed, network performance, I/O performance, GPU performance, and/or FPGA performance. According to an embodiment, the method further includes: receiving a second request to configure a specified node according to a configuration input; sending a reconfiguration request to the specified node, the reconfigure request comprising the configuration input; and receiving a pass/fail result and actual performance data from the specified node, the pass/fail result and actual performance data indicating performance of specified node after being reconfigured in accordance to the configuration input.

Another embodiment of the present invention is an apparatus that includes: means for tracking a plurality of resources available in a node; means for determining different possible configurations of the plurality of resources; means for generate a performance estimate for each of the possible configurations; and means for providing the different possible configurations of the plurality of resources and the performance estimate for each of the possible configurations to a configuration manager. In one embodiment, the different possible configurations of the plurality of resources may include valid configurations, most frequently used configurations, specific configurations, and/or sliding scale configurations that include a range of resources. In one embodiment, the method further includes identifying volatile memory sets and persistent memory sets in a plurality of memory resources, determining latency and/or bandwidth data for each memory set based on information relating to memory type and interleave, assigning weights to the latency and/or bandwidth data, and normalizing latency and bandwidth data for each memory set using the assigned weights. In some embodiments, the method further includes providing the assigned weights and the latency and bandwidth data from each node to a configuration manager. According to some embodiments, the method further includes receiving a reconfiguration request to reconfigure the node based on a configuration input from the configuration manager, responsively reconfiguring the plurality of resources in the node based on the reconfiguration request, and providing a pass/fail result and actual performance data to the configuration manager. The plurality of resources may include memory resources, storage resources, core resources, networking resources, I/O resources, and/or compute resources.

Another embodiment of the present invention is an apparatus that includes: means for receiving a first request to select one or more nodes based on a set of performance requirements; means for receiving from each of a plurality of nodes a set of different possible resource configuration and a performance estimate for each of possible configuration in the set; and means for iterating through the set of different possible resource configurations and the performance estimates to determine one or more node configurations best matching the set of performance requirements. In some embodiments, the set of performance requirements may include: memory type, memory capacity, memory performance, memory mode, storage capacity, storage performance, core count, core speed, network performance, I/O performance, GPU performance, and/or FPGA performance. According to an embodiment, the method further includes: receiving a second request to configure a specified node according to a configuration input; sending a reconfiguration request to the specified node, the reconfigure request comprising the configuration input; and receiving a pass/fail result and actual performance data from the specified node, the pass/fail result and actual performance data indicating performance of specified node after being reconfigured in accordance to the configuration input.

Figure 11:
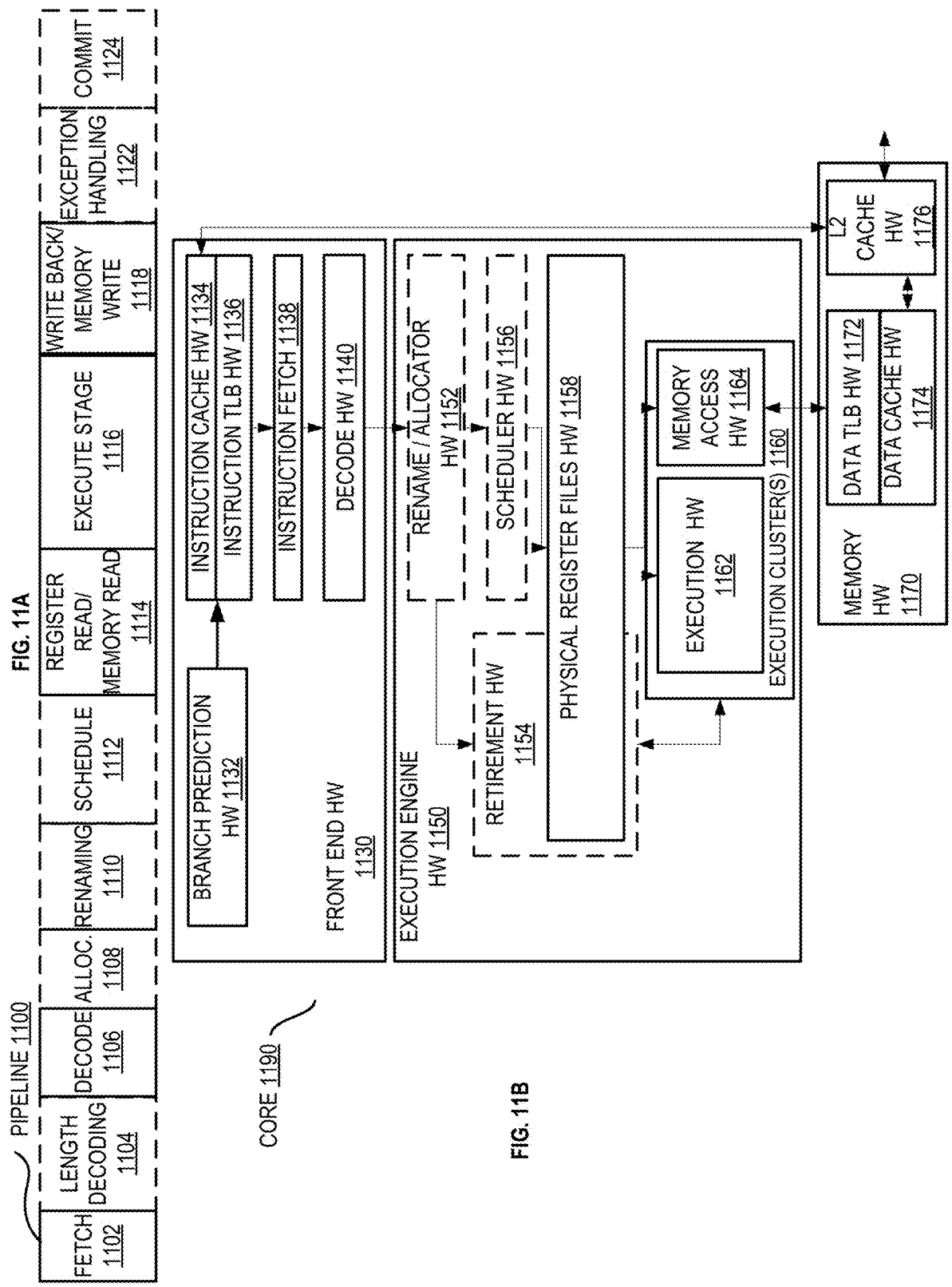
FIG. 11A is a block diagram illustrating both an exemplary in-order pipeline and an exemplary register renaming, out-of-order issue/execution pipeline according to embodiments of the invention.
FIG. 11B is a block diagram illustrating both an exemplary embodiment of an in-order architecture core and an exemplary register renaming, out-of-order issue/execution architecture core to be included in a processor according to embodiments of the invention.

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end hardware 1130 coupled to an execution engine hardware 1150, and both are coupled to a memory hardware 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end hardware 1130 includes a branch prediction hardware 1132 coupled to an instruction cache hardware 1134, which is coupled to an instruction translation lookaside buffer (TLB) 1136, which is coupled to an instruction fetch hardware 1138, which is coupled to a decode hardware 1140. The decode hardware 1140 (or decoder) may decode instructions, and generate as an output one or more microoperations, micro-code entry points, microinstructions, other instructions, or other control signals, which are decoded from, or which otherwise reflect, or are derived from, the original instructions. The decode hardware 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode hardware 1140 or otherwise within the front end hardware 1130). The decode hardware 1140 is coupled to a rename/allocator hardware 1152 in the execution engine hardware 1150.

The execution engine hardware 1150 includes the rename/allocator hardware 1152 coupled to a retirement hardware 1154 and a set of one or more scheduler hardware 1156. The scheduler hardware 1156 represents any number of different schedulers, including reservations stations, central instruction window, etc. The scheduler hardware 1156 is coupled to the physical register file(s) hardware 1158. Each of the physical register file(s) hardware 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1158 comprises a vector registers hardware, a write mask registers hardware, and a scalar registers hardware. These register hardware may provide architectural vector registers, vector mask registers, and general purpose registers. The physical register file(s) hardware 1158 is overlapped by the retirement hardware 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 1154 and the physical register file(s) hardware 1158 are coupled to the execution cluster(s) 1160. The execution cluster(s) 1160 includes a set of one or more execution hardware 1162 and a set of one or more memory access hardware 1164. The execution hardware 1162 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1156, physical register file(s) hardware 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1164). It should also be understood that where separate pipelines are used, one or more of these pipelines may be out-of-order issue/execution and the rest in-order.

The set of memory access hardware 1164 is coupled to the memory hardware 1170, which includes a data TLB hardware 1172 coupled to a data cache hardware 1174 coupled to a level 2 (L2) cache hardware 1176. In one exemplary embodiment, the memory access hardware 1164 may include a load hardware, a store address hardware, and a store data hardware, each of which is coupled to the data TLB hardware 1172 in the memory hardware 1170. The instruction cache hardware 1134 is further coupled to a level 2 (L2) cache hardware 1176 in the memory hardware 1170. The L2 cache hardware 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode hardware 1140 performs the decode stage 1106; 3) the rename/allocator hardware 1152 performs the allocation stage 1108 and renaming stage 1110; 4) the scheduler hardware 1156 performs the schedule stage 1112; 5) the physical register file(s) hardware 1158 and the memory hardware 1170 perform the register read/memory read stage 1114; the execution cluster 1160 perform the execute stage 1116; 6) the memory hardware 1170 and the physical register file(s) hardware 1158 perform the write back/memory write stage 1118; 7) various hardware may be involved in the exception handling stage 1122; and 8) the retirement hardware 1154 and the physical register file(s) hardware 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1134/1174 and a shared L2 cache hardware 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 12:
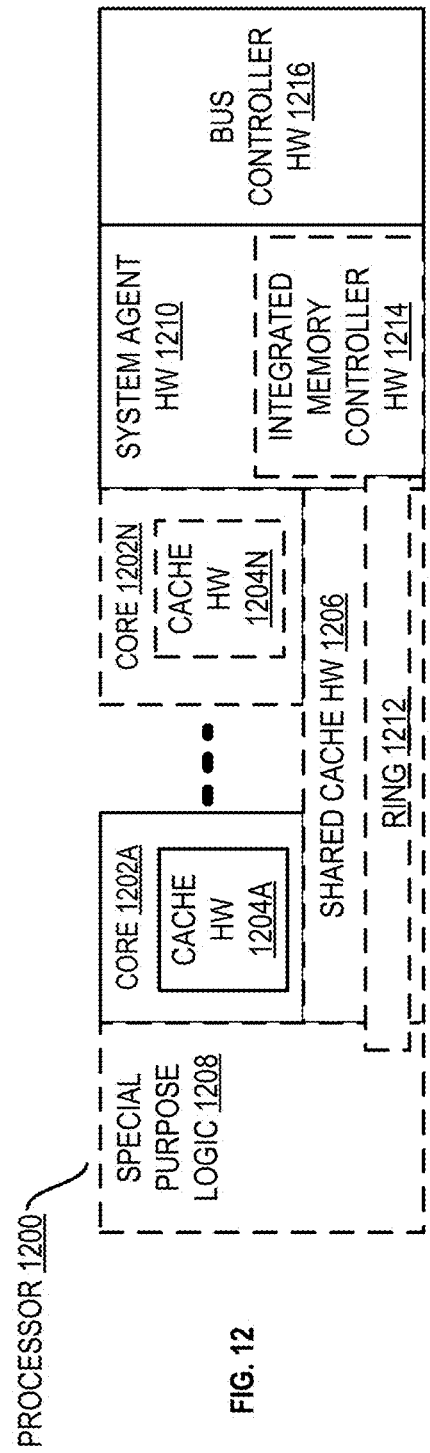
FIG. 12 is a block diagram of a single core processor and a multicore processor with integrated memory controller and graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller hardware 1216, while the optional addition of the dashed lined boxes illustrates an alternative processor 1200 with multiple cores 1202A-N, a set of one or more integrated memory controller hardware 1214 in the system agent hardware 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1206, and external memory (not shown) coupled to the set of integrated memory controller hardware 1214. The set of shared cache hardware 1206 may include one or more mid-level caches, such as level 2 (L2), level 3 (L3), level 4 (L4), or other levels of cache, a last level cache (LLC), and/or combinations thereof. While in one embodiment a ring based interconnect hardware 1212 interconnects the integrated graphics logic 1208, the set of shared cache hardware 1206, and the system agent hardware 1210/integrated memory controller hardware 1214, alternative embodiments may use any number of well-known techniques for interconnecting such hardware. In one embodiment, coherency is maintained between one or more cache hardware 1206 and cores 1202-A-N.

In some embodiments, one or more of the cores 1202A-N are capable of multithreading. The system agent 1210 includes those components coordinating and operating cores 1202A-N. The system agent hardware 1210 may include for example a power control unit (PCU) and a display hardware. The PCU may be or include logic and components needed for regulating the power state of the cores 1202A-N and the integrated graphics logic 1208. The display hardware is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set. In one embodiment, the cores 1202A-N are heterogeneous and include both the "small" cores and "big" cores described below.

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
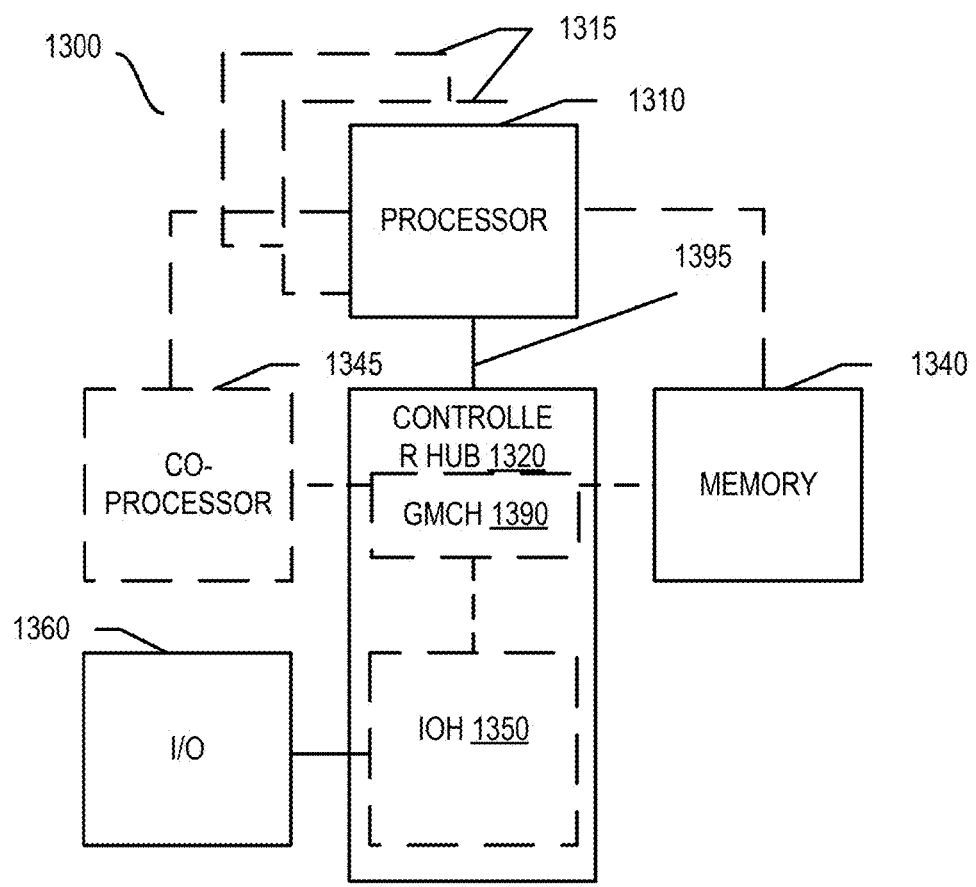
FIG. 13 illustrates a block diagram of a system in accordance with one embodiment of the present invention.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface, or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
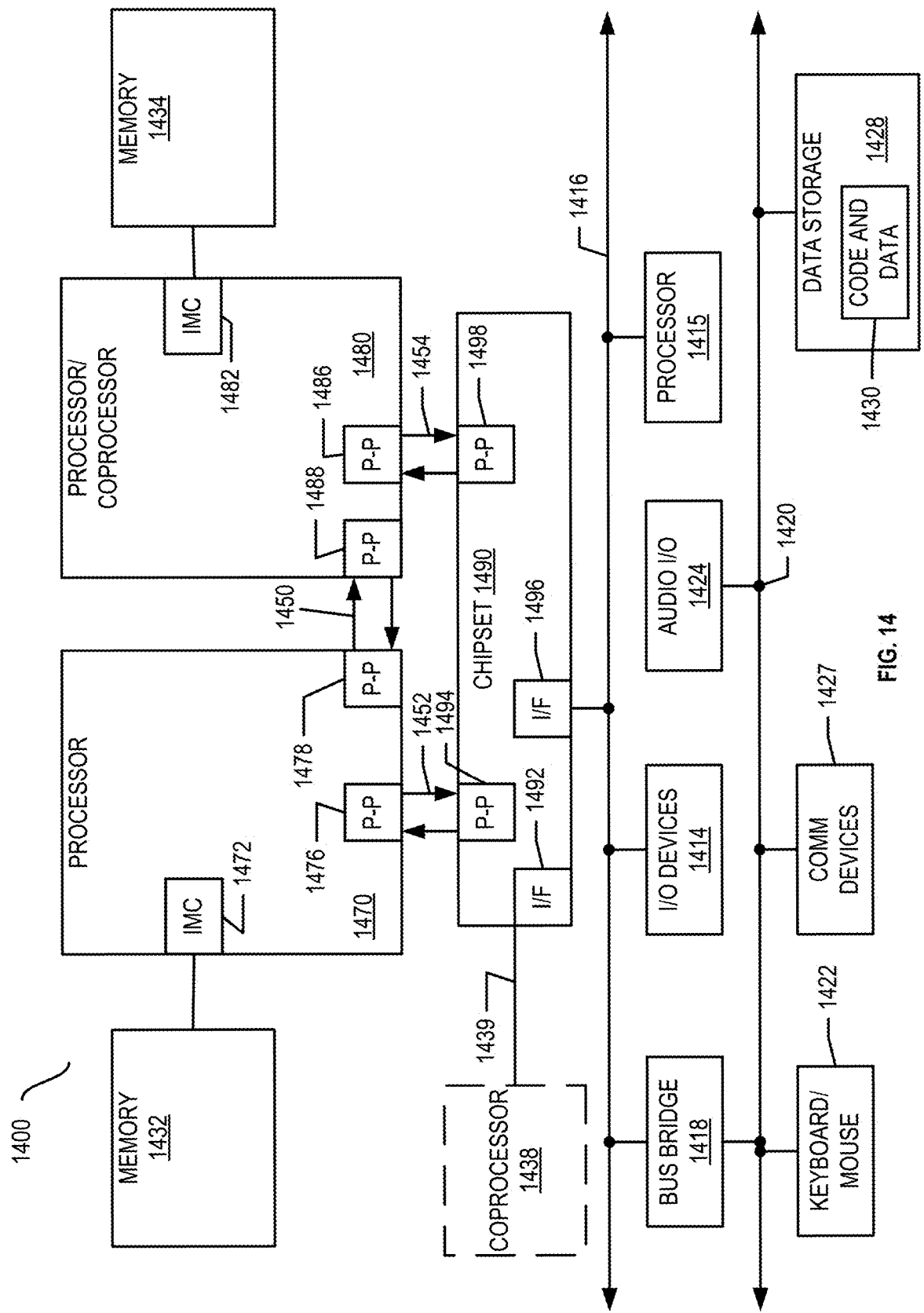
FIG. 14 illustrates a block diagram of a second system in accordance with an embodiment of the present invention.

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) hardware 1472 and 1482, respectively. Processor 1470 also includes as part of its bus controller hardware point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) hardware), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage hardware 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
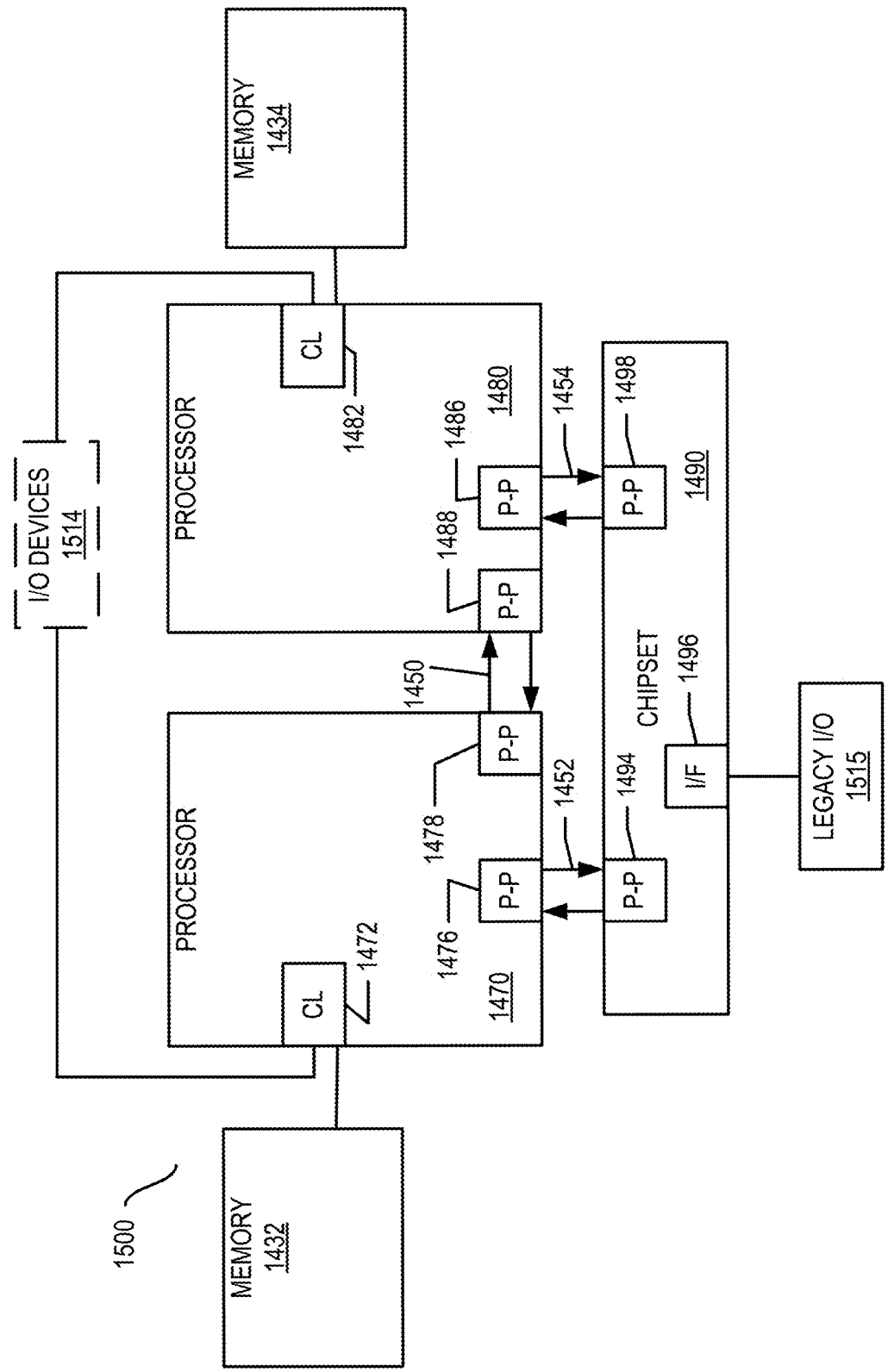
FIG. 15 illustrates a block diagram of a third system in accordance with an embodiment of the present invention.

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller hardware and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
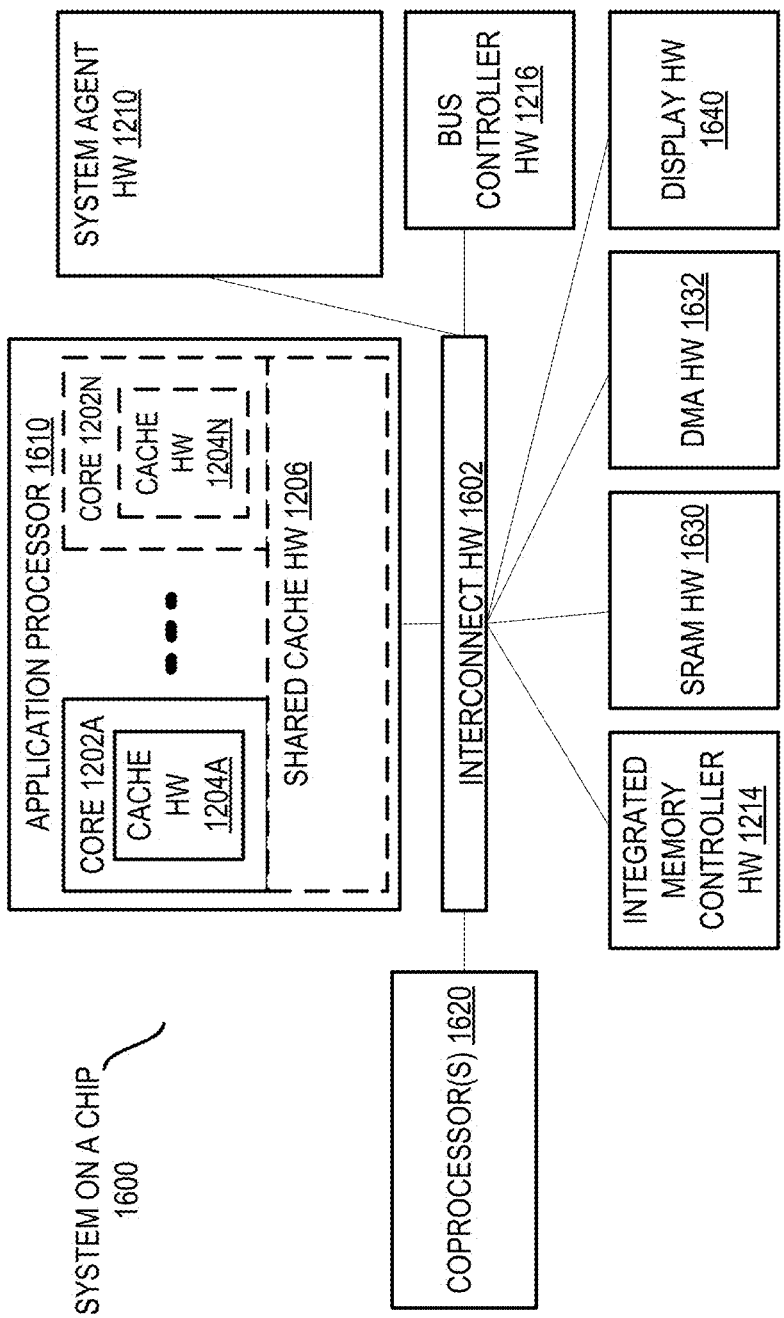
FIG. 16 illustrates a block diagram of a system on a chip (SoC) in accordance with an embodiment of the present invention.

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect hardware 1602 is coupled to: an application processor 1610 which includes a set of one or more cores 1202A-N and shared cache hardware 1206; a system agent hardware 1210; a bus controller hardware 1216; an integrated memory controller hardware 1214; a set or one or more coprocessors 1620 which may include integrated graphics logic, an image processor, an audio processor, and a video processor; an static random access memory (SRAM) hardware 1630; a direct memory access (DMA) hardware 1632; and a display hardware 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
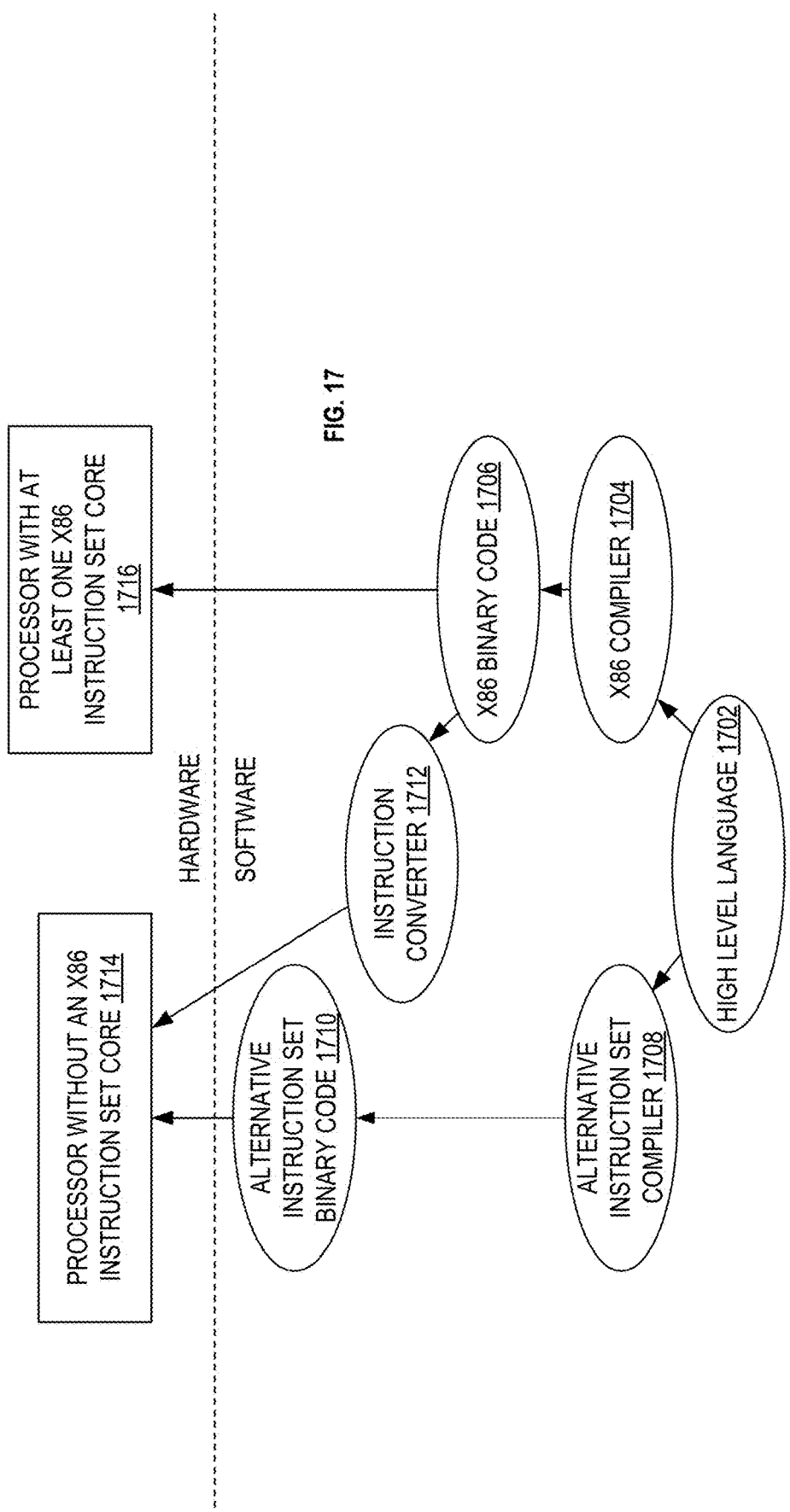
FIG. 17 illustrates a block diagram contrasting the use of a software instruction converter to convert binary instructions in a source instruction set to binary instructions in a target instruction set according to embodiments of the invention.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented in a node manager, the method comprising:
    tracking, by the node manager of a node, a plurality of resources available in the node;
    determining, by the node manager, different possible configurations of the plurality of resources, the different possible configurations comprising frequently-used configurations and/or previously-used configurations;
    generating, by the node manager, a performance estimate for each of the possible configurations;
    providing, by the node manager, the different possible configurations of the plurality of resources and the performance estimate for each of the possible configurations to a configuration manager separate from the node manager, the configuration manager further to receive resource combinations and associated performance estimates from other node managers;
    receiving a reconfiguration request to reconfigure the node based on a configuration input from the configuration manager;
    responsively reconfiguring the plurality of resources in the node based on the reconfiguration request; and
    providing a pass/fail result and actual performance data to the configuration manager.

2. The method of claim 1, wherein the different possible configurations of the plurality of resources further comprise valid configurations.

3. The method of claim 1, wherein the different possible configurations of the plurality of resources further comprise most frequently used configurations.

4. The method of claim 1, wherein the different possible configurations of the plurality of resources further comprise specific configurations.

5. The method of claim 1, wherein the different possible configurations of the plurality of resources comprise sliding scale configurations comprising a range of resources.

6. The method of claim 1, further comprising:
    identifying volatile memory sets and persistent memory sets in a plurality of memory resources;
    determining latency and/or bandwidth data for each memory set based on information relating to memory type and interleave;
    assigning weights to the latency and/or bandwidth data; and
    normalizing latency and bandwidth data for each memory set using the assigned weights.

7. The method of claim 6, wherein the method further comprises providing the assigned weights and the latency and bandwidth data from each node to a configuration manager.

8. The method of claim 1, wherein the plurality of resources comprises: memory resources, storage resources, core resources, networking resources, I/O resources, and/or compute resources.

9. A method implemented in a configuration manager, the method comprising:
    receiving, from a user or user program, a first request to select one or more nodes based on a set of performance requirements;
    receiving from a node manager of each of a plurality of nodes a set of different possible resource configuration in each node and a performance estimate for each of possible configuration in the set, the different possible configurations comprising frequently-used configurations and/or previously-used configurations;
    iterating through the different possible resource configurations and the performance estimates from the plurality of nodes to determine one or more node configurations best matching the set of performance requirements;
    receiving a second request to configure a specified node according to a configuration input;
    sending a reconfiguration request to the specified node, the reconfigure request comprising the configuration input; and
    receiving a pass/fail result and actual performance data from the specified node, the pass/fail result and actual performance data indicating performance of specified node after being reconfigured in accordance to the configuration input.

10. The method of claim 9, wherein the set of performance requirements comprises: memory type, memory capacity, memory performance, memory mode, storage capacity, storage performance, core count, core speed, network performance, I/O performance, GPU performance, and/or FPGA performance.

11. A non-transitory machine readable medium having program code stored thereon which, when executed by a machine, causes the machine to perform operations of:
  tracking, by a node manager of each of a plurality of nodes, a plurality of resources available in each of the plurality of nodes;
  determining, by the node manager of each of the plurality of nodes, different possible configurations of the plurality of resources in each of the plurality of nodes, the different possible configurations comprising frequently-used configurations and/or previously-used configurations;
  generating, by the node manager of each of the plurality of nodes, a performance estimate for each of the possible configurations for each of the plurality of nodes;
  receiving, by a configuration manager, a first request, from a user or user program, to select one or more nodes based on a set of performance requirements;
  receiving, by the configuration manager, the different possible configurations and the performance estimates from the node manager of each of the plurality of nodes,
  iterating through the different possible configurations and the performance estimates, by the configurations manager, to determine one or more node configurations best matching the set of performance requirements;
  receiving a second request to configure a specified node according to a configuration input;
  sending a reconfiguration request to the specified node, the reconfigure request comprising the configuration input; and
  receiving a pass/fail result and actual performance data from the specified node, the pass/fail result and actual performance data indicating performance of specified node after being reconfigured in accordance to the configuration input.

12. A system comprising:
  a plurality of node groups, each node group comprising one or more nodes, each node comprising:
    a plurality of resources;
    a node manager to:
      track the plurality of resources available in the node;
      determine different possible configurations of the plurality of resources the different possible configurations comprising frequently-used configurations and/or previously-used configurations; and
      generate a performance estimate for each of the possible configurations;
  a configuration manager communicatively coupled to the node manager of each of the nodes, the configuration manager to:
    receive, from a user or user program, a request to select one or more nodes based on a set of performance requirements;
    receive, from the node manager of each node, the different possible configurations of the plurality of resources in the node and the performance estimate for each of the possible configurations; and
    iterate through collected configurations and performance estimates to determine one or more node configurations best matching the set of performance requirements;
  a hardware switch to communicatively couple the plurality of node groups to the configuration manager; and
  a rack to house the plurality of node groups, the configuration manager, and the switch;
  wherein the node manager of a first node is further to:
    receive a reconfiguration request to reconfigure the first node based on a configuration input from the configuration manager, the configuration input identifying a specific configuration;
    responsively reconfigure the plurality of resources in the first node based on the configuration input; and
    provide a pass/fail result and actual performance data to the configuration manager, the pass/fail result and actual performance data indicating performance of the first node after being reconfigured in accordance to the configuration input.

13. The system of claim 12, wherein each of the plurality of nodes corresponds to a pooled nodes manager, wherein the pooled nodes manager to collect from each respective node and provide to the configuration manager, the different possible configurations of the plurality of resources and the performance estimate for each of the possible configurations.

14. The system of claim 12, wherein the different possible configurations of the plurality of resources further comprise valid configurations.

15. The system of claim 12, wherein the different possible configurations of the plurality of resources further comprise most frequently used configurations.

16. The system of claim 12, wherein the different possible configurations of the plurality of resources further comprise specific configurations.

17. The system of claim 12, wherein the different possible configurations of the plurality of resources comprise sliding scale configurations comprising a range of the plurality of resources.

18. The system of claim 12, wherein to generate performance estimates for each of the possible configurations comprises:
  identifying volatile memory sets and persistent memory sets in a plurality of memory resources;
  determining latency and/or bandwidth data for each memory set based on information relating to memory type and interleave;
  assign weights to the latency and/or bandwidth data; and
  normalize latency and bandwidth data for each memory set using the assigned weights.

19. The system of claim 18, wherein configuration manager to receive the assigned weights and the latency and bandwidth data from each node.

20. The system of claim 12, wherein the plurality of resources comprises: memory resources, storage resources, core resources, networking resources, I/O resources, and/or compute resources.

21. The system of claim 12, wherein the set of performance requirements comprises: memory type, memory capacity, memory performance, memory mode, storage capacity, storage performance, core count, core speed, network performance, I/O performance, GPU performance, and/or FPGA performance.

22. The system of claim 12, wherein each of the plurality of node groups comprises a pooled nodes manager to receive the performance estimate generated by the node managers of each node within the node group and to transmit the performance estimates to the configuration manager through the hardware switch.

23. The system of claim 12, wherein the configuration manager is to receive a configuration table from the node manager of each node, each entry of the configuration table comprising a configuration identifier identifying one of the possible configurations of the plurality of resources in the node.

* * * * *